US009350536B2

(12) United States Patent
Sabin

(10) Patent No.: US 9,350,536 B2
(45) Date of Patent: May 24, 2016

(54) CLOUD KEY MANAGEMENT SYSTEM

(71) Applicant: Jason Allen Sabin, Lehi, UT (US)

(72) Inventor: Jason Allen Sabin, Lehi, UT (US)

(73) Assignee: DIGICERT, INC., Lindon, UT (US)

( * ) Notice: Subject to any disclaimer, the term of this patent is extended or adjusted under 35 U.S.C. 154(b) by 0 days.

(21) Appl. No.: 13/733,646

(22) Filed: Jan. 3, 2013

(65) Prior Publication Data

US 2014/0050317 A1  Feb. 20, 2014

Related U.S. Application Data

(60) Provisional application No. 61/683,842, filed on Aug. 16, 2012.

(51) Int. Cl.
*H04L 9/08* (2006.01)
(52) U.S. Cl.
CPC ............... *H04L 9/08* (2013.01); *H04L 9/0861* (2013.01); *H04L 9/0894* (2013.01)
(58) Field of Classification Search
CPC .................................. H04L 9/00; G06F 21/00
See application file for complete search history.

(56) References Cited

U.S. PATENT DOCUMENTS

| 8,625,802 | B2* | 1/2014 | Parann-Nissany | 380/278 |
|---|---|---|---|---|
| 8,788,843 | B2* | 7/2014 | Kopasz et al. | 713/189 |
| 8,826,013 | B1* | 9/2014 | Kodukula et al. | 713/165 |
| 2008/0319909 | A1* | 12/2008 | Perkins et al. | 705/50 |
| 2010/0211781 | A1* | 8/2010 | Auradkar et al. | 713/168 |
| 2010/0266132 | A1* | 10/2010 | Bablani et al. | 380/286 |
| 2010/0299313 | A1* | 11/2010 | Orsini et al. | 707/652 |
| 2011/0072489 | A1* | 3/2011 | Parann-Nissany | 726/1 |
| 2011/0225423 | A1* | 9/2011 | Lynch | 713/171 |
| 2014/0019753 | A1* | 1/2014 | Lowry et al. | 713/155 |

FOREIGN PATENT DOCUMENTS

EP  2396922 A2  12/2011

* cited by examiner

*Primary Examiner* — Jeffrey Pwu
*Assistant Examiner* — Wasika Nipa
(74) *Attorney, Agent, or Firm* — Brinks Gilson & Lione; Ryan L. Marshall; John C. Bacoch

(57) ABSTRACT

This invention uses a cloud-based key management system to store, retrieve, generate, and perform other key operations. The cloud-based system ensures security of the keys while preventing their loss or destruction. Using this invention, a company can now manage, audit, and maintain control and security around their keys. Security event auditing permits evaluation of the operations to ensure that each step is completely secure.

33 Claims, 7 Drawing Sheets

US 9,350,536 B2

CLOUD KEY MANAGEMENT SYSTEM

CROSS-REFERENCE TO RELATED APPLICATION

This application claims the benefit of provisional application Ser. No. 61/683,842, filed on Aug. 16, 2012, which is incorporated entirely herein by reference.

BACKGROUND

Within an organization, individuals and devices may need multiple key pairs to perform a variety of tasks. These key pairs are often scattered across various computers, servers, and with multiple individuals. As PKI continues to grow, keys are often misplaced, inadvertently deleted, or lost during hardware failures. The industry lacks a central location to securely store all these keys. Loss of a key pair is a catastrophic event for a company as it can make communication and vital transactions unavailable or inaccessible.

SUMMARY OF THE INVENTION

This invention uses a cloud-based key management system to securely store, retrieve, generate, and perform other key operations. The cloud-based system ensures security of the keys while preventing their loss or destruction. Using this invention a company can now manage, audit, and maintain control and security around their keys. Security event auditing permits evaluation of the operations to ensure that each step is completely auditable and secure.

The invention has a key agent that accepts key-related requests from requesters. The requesters might be individuals, applications, or hardware. The request is transmitted to a cloud-based server through a secure tunnel created by either the key agent or the cloud key service.

The cloud key service uses a multi-tenancy manager to interpret the request and route the request to the correct segment of the cloud key service. An identity service module validates identity of the requester and verifies the request's authorization.

If the request is authorized, a server manager or key manager performs the key operation on a segmented portion of the cloud service. A key validator checks to ensure the key operation was performed correctly.

Keys are stored securely in an encrypted key store on the cloud key service systems. The encrypted store is in a segmented portion of the system to prevent confusion between requesters and enhance security. For enhanced security, the key agent may store the key used to encrypt the stored keys.

Throughout the process, security events are created and stored in a database to monitor for security breaches, fully auditable trail of each action performed, and ensure correct operations of the system.

DESCRIPTION OF INVENTION

Figure 1:
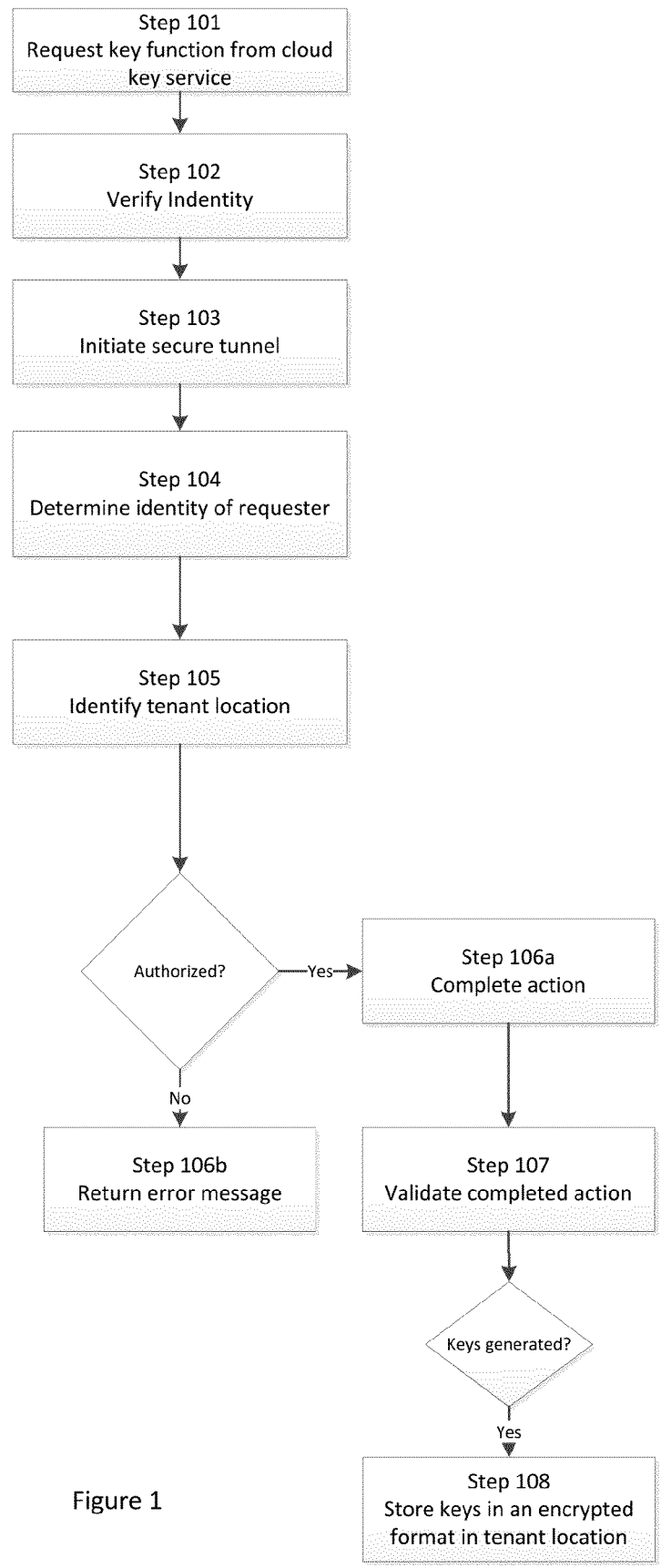
FIG. 1 shows a flowchart of a first embodiment of the invention.
Figure 2:
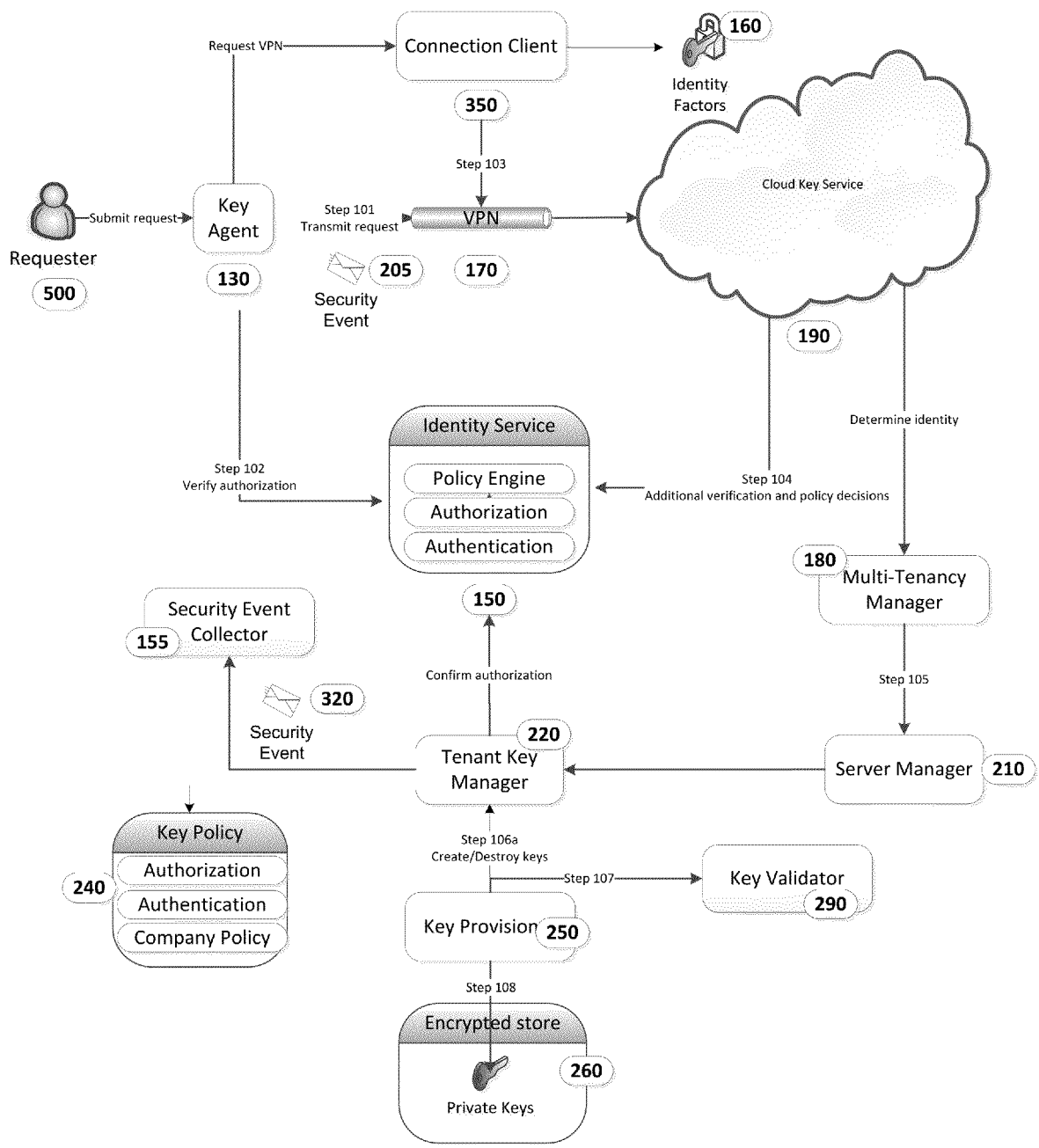
FIG. 2 depicts a diagram of the components used in an embodiment of the invention.

The invention discloses a method of providing cloud based key-management services to facilitate remote key usage and storage. The invention ensures security against key compromise while preventing accidental key loss or destruction. The Figures provided are for the purpose of illustrating the invention and preferred embodiment. However, the invention is not limited to the specific implementation shown in the Figures as several of the steps and components are optional or intended only to increase security of the overall system. A component, as used herein, may refer to a software package, virtual appliance, system, or other apparatus or process that can perform the described function.

The following is a description of some of the components shown in the Figures that are used to describe the invention.

A key is cryptographic key or cryptographic key pair (a private key 260 and public key 280). Keys are used to encrypt communication, provide non-repudiation services, digitally sign documents, identify users, and for a variety of other purpose.

A key agent 130 is a software package, virtual appliance, or system used to communicate with a cloud key service 190. The key agent can execute on a machine/server local to the requester 500 or remotely on the cloud key service provider's systems.

A tenant key manager 220 is a component that performs key management functions through the cloud key service. The tenant key manager is generally controlled by the cloud service provider but may be under control of another entity.

A key provisioner 250 is a component that performs key operations, such as creating key pairs, deleting keys, key storage, etc.

A key validator 290 is a component that performs validation on a key in accordance with a defined policy. Key validation may include validating the key for validity, key size, length, and key algorithm. Key validation may also include custom events such as checking revocation status, submitting revocation requests, or generating revocation instructions if the certificate is not revoked. Other policy-based validation events may be based off the time-to-live, the requested reason for retrieval of a key, or the identity of the key retriever.

A security event collector 300 is a component that receives or collects and distributes security events to a security information and event manager (SIEM) server 330 or other security event manager. A security event manager can be any device or process used to manage security and audit events or store security and audit events in a database.

An identity vetting service 150 is a process used to verify the identity and/or authorization of the key requester. The identity vetting service may be performed by a key agent 130, the cloud key service 190, a third party module, or a combination of modules. Verification may include accessing a policy engine to determine the rights of the requester and may require presentment of set credentials. The level of vetting provided usually depends on the requested, the value of the keys, and the requested key function. For example, a call for keys associated with a rudimentary certificate may require a simple password. Higher value keys, such keys used to protect government secrets, may require biometric input or manual vetting of the requester's access rights. Identity vetting may be an automated process or may include an out-ofbands authentication component, such as a phone call from a service-provider to verify the requester's authorization.

Requesters 500 to a cloud key management service may include any combination of servers 100, people 110, and applications 120. A requester is not necessarily comprised only of a single organization, and the components operating in a single requester may belong to a single legal entity or be spread over multiple legal entities. The requester use keys to perform a variety of functions. Some may require the use of keys on a continuous basis or simply require key storage for future use.

In Step 101 of the embodiment depicted in FIG. 1, a requester 500 uses a key agent 130 to communicate requests 205 to the cloud key service 190. Generally, the communication occurs through a GUI and an API interface of the key agent. For example, a requester requiring a key can access a GUI to request the service provider create a new key. The GUI uses the cloud key service's API functions to initiate the key request process on the cloud key service. Another example is where a server or application implements a dynamic workflow process that requires a call through API when making key management decisions. The key agent communicates with the cloud key service to retrieve the key management policy and, if appropriate, the corresponding key pair.

In Step 102, the key agent initiates an identity vetting service 150 to determine whether the request is authorized prior to retrieving the key from the cloud key service 190. Usually, the identity vetting requires a check against the tenant's policy engine to determine the level of access authorized. Identity vetting may also evaluate the identity of the requester using set identity factors 160. Identity factors may include the possession of a device certificate, API keys, passwords, tokens, or any other similar methods for establishing identity.

In Step 103, the connection client 350 initiates a secure tunnel 170 to the cloud key service 190. This secure tunnel could be a SSL tunnel, SSH tunnel, or any other type of secure tunnel communication.

In Step 104, the cloud key service 180 determines the identity of the requester 500 and the appropriate location of the keys. The cloud key service may have an additional identity vetting service 150 that determines the communication's authorization. In connection with the identity process, the multi-tenancy manager can communicate with a policy engine to determine the rights granted to the requester in connection with the request. These rights may include limit the requester right to use, retrieve, create, or destroy keys. For example a mail server may be permitted only to use keys while accessing the cloud key service but be restricted from retrieving, creating, or storing keys. Similarly, an administrator for the network may create or destroy keys on behalf of users but, for security reasons, be restricted from using or retrieving keys.

In Step 105, the multi-tenancy manager 190 identifies the appropriate tenant location of the cloud key service. The segmented locations, which may be virtually or physically segmented locations, prevent one requester from affecting the key stores in other tenant spaces. The server manager may be part of the multi-tenancy component or comprise an entirely new process, communication, or just a software module.

The key agent 130 may transmit the request 205 to the server manager after the communication and identity are established or may transmit the request to the various parts of the process. For example, the key agent could wait until a secure tunnel to the server manager is established or may send the request to the multi-tenancy manager which forwards the request to the server manager.

Regardless of when the request is sent, in Step 106, the server manager 210 either takes action or requests that a tenant key manager 220 take action based on the authorization established by the identity service and the request contents. Using a tenant key manager provides extra security. Possible actions include performing the authorized action, creating/provisioning a key pair, deleting a key pair, using a key pair to decrypt or encrypt a communication or object, returning an error or unauthorized message, or similar action.

To execute a create/provision action, the server manager 210 calls a tenant key manager 220 that retrieves the appropriate authorization from the identity service 150. If authorized, the tenant key manager creates the key pair in accordance with the requirements set by a key policy 240, which may dictate such things as the appropriate key size, key algorithm, validity periods, validation servers, and corresponding certificate contents.

The key provisioner 250 interacts with the tenant key manager 220 to create or destroy keys pursuant to an authorized request. Key pairs are created within an encrypted store 260. A single tenant space may have multiple encrypted stores or use one single encrypted store for all keys. Typically, each key should be stored in a separate encrypted store to limit the potential damage caused by the compromise of a single encrypted store.

The encrypted store is encrypted using a key held by the requester, by a system of the requester, in the requester's tenant space, or by the key agent. The key used to encrypt the encrypted store is called the store key. The store key is transmitted through the key agent to the tenant key manager.

Although the encrypted store is shown as being part of the cloud key service, the encrypted store could also be stored in the key agent. In this case, the key agent would return the key after the request is processed and approved by the cloud key service.

In Step 107, the tenant key manager 220 can use a key validator 290 to execute a series of validation tests on generated or stored keys to ensure the key meets set criteria before being created, used, or retrieved. For example, to prevent impersonation of a key holder, the key validator may require revocation of a digital certificate associated with the key pair before returning requested keys. A key validator could also check the validity period of the corresponding digital certificate before performing a use action. The validation performed by the key validator is typically set by a policy engine controlled by either the entity receiving the services, a service provider such as a certification authority, or a combination of the two.

Throughout the key management process, the key agent and cloud key service can create security events to document the actions taken for audit and security purposes. These security events are collected by the security event manager 300 for the cloud key service and the security event collector 155 for the key agent. Security events are stored in a security events database. The cloud key service may transmit these events back to the requester's or the requester's SIEM systems 330 through the secure tunnel 170. Security events 320 and any requested keys may also be returned via the secure tunnel. Once the key management process is complete, the secure tunnel is destroyed to prevent unauthorized access.

Figure 3:
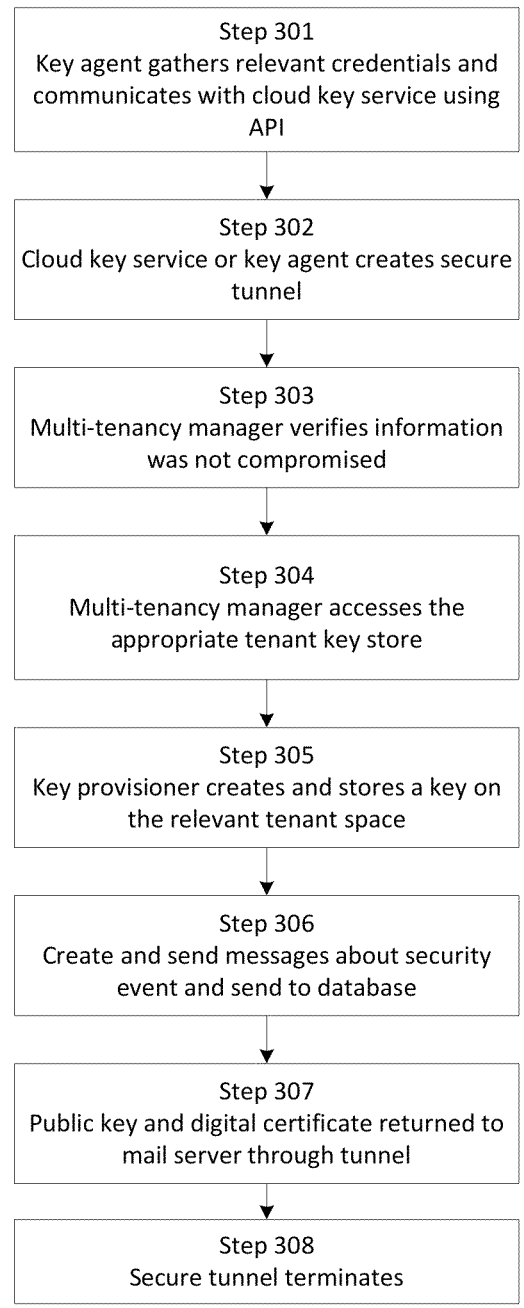
FIG. 3 shows a flowchart for a second embodiment of the invention.
Figure 4:
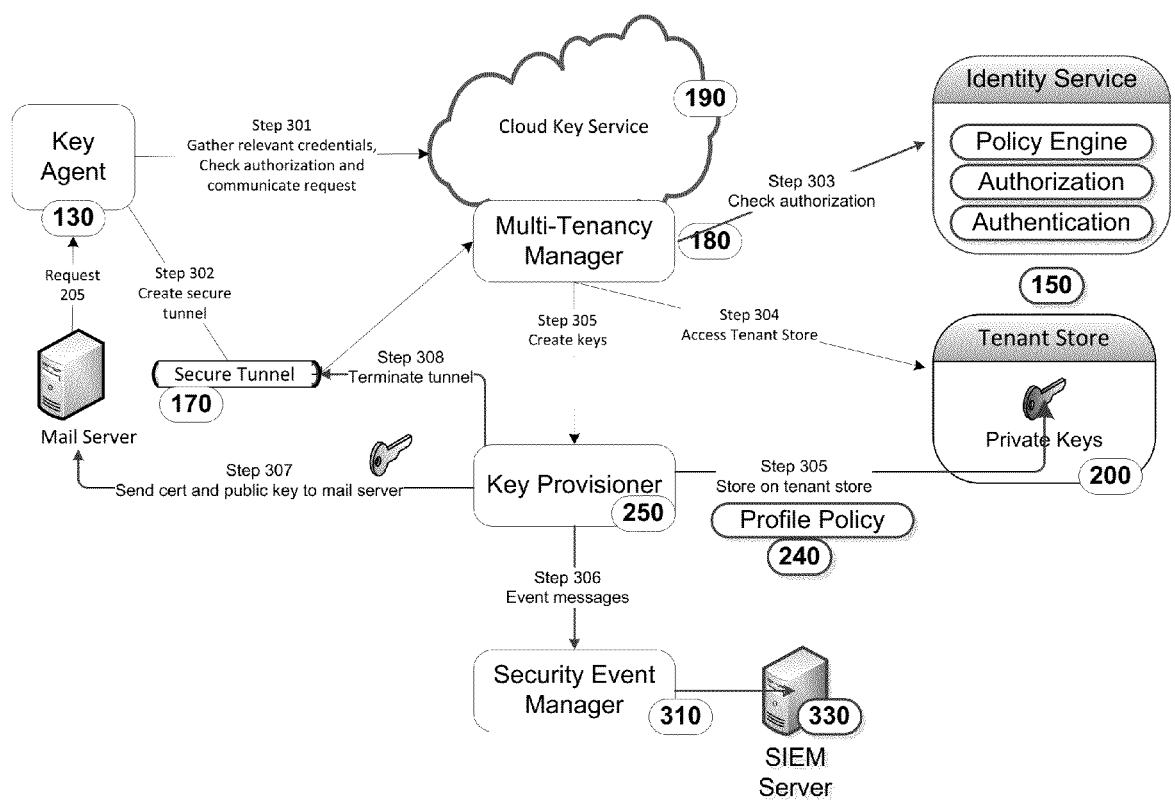
FIG. 4 depicts a diagram of the components used by the flowchart shown in FIG. 3.

In a second embodiment, shown in FIG. 3 and FIG. 4, a company's mail server 100 requires the use of keys 260 to sign or encrypt and decrypt mail messages sent or received by the company's internal network. For identification and security reasons, the mail server needs to sign and encrypt each message using a private key that is uniquely associated with the mail user. Generating and installing a key pair for each mail user is cumbersome and risks potential problems if the mail user later leaves the company or has a system failure that results in a loss of the private key.

Instead, the mail server uses a key agent 130 to communicate with a cloud key service 190 and create keys when needed. In Step 301, when the mail server requires a new key, the key agent gathers the relevant credentials for the email sender, checks the authorization of the key request, and communicates with the cloud key service using an API. In Step 302, the cloud key service or key agent creates a secure tunnel 170 through which the request and identification information is transferred to the multi-tenancy manager 180. In Step 303, the multi-tenancy manager 180 checks the identity information and policy engine to verify that the information was not compromised and matches the policy expectations. In Step 304, the multi-tenancy manager accesses the appropriate tenant key store 200. In Step 305, the key provisioner 250 creates and stores a key on the relevant tenant space. The key provisioner also creates a corresponding digital certificate associated with the key.

The key provisioner creates the key pair and certificate in accordance with a profile 240 established by the operator of the cloud key service. The profile information is retrieved from a policy engine maintained on the cloud key service. In addition, the key provisioner sets certain identity attributes specified by the company. These attributes are retrieved by the key agent from a policy engine residing on the mail server and sent to the multi-tenancy server and key provisioner over the secure tunnel.

The key provisioner also receives a policy instruction to securely store the key in an encrypted key store. The key is encrypted using a new key that is generated by the key agent, provided by the requester, or generated on the cloud key service and transmitted to the key agent. For security reasons, the cloud key service operator should not retain a copy of the key to the encrypted key store.

In Step 306, the security events manager 310 receives a message about the key's creation and generates a security event. Security events may include information about anomalies detected during the process, the completion of each step in the process, and policy decisions made during the process. Security events are sent to a security event database and a remote SIEM server. The security events manager records relevant information in the security event, such as the identity of the requester, the length of time required to create the key, and any anomalies detected during the creation process.

In Step 307, the key provisioner sends the public key and digital certificate to the email address listed in the digital certificate. The key is transmitted in an encrypted format for security reasons. The email serves as verification of the request and notice to the email account holder of the certificate's creation. Whether or not the requester receives a copy of the key is dependent on the rights assigned in the key agent's or cloud key service's policy engine.

In Step 308, the secure tunnel terminates, freeing resources and preventing any unauthorized access into the secure key store.

Figure 5:
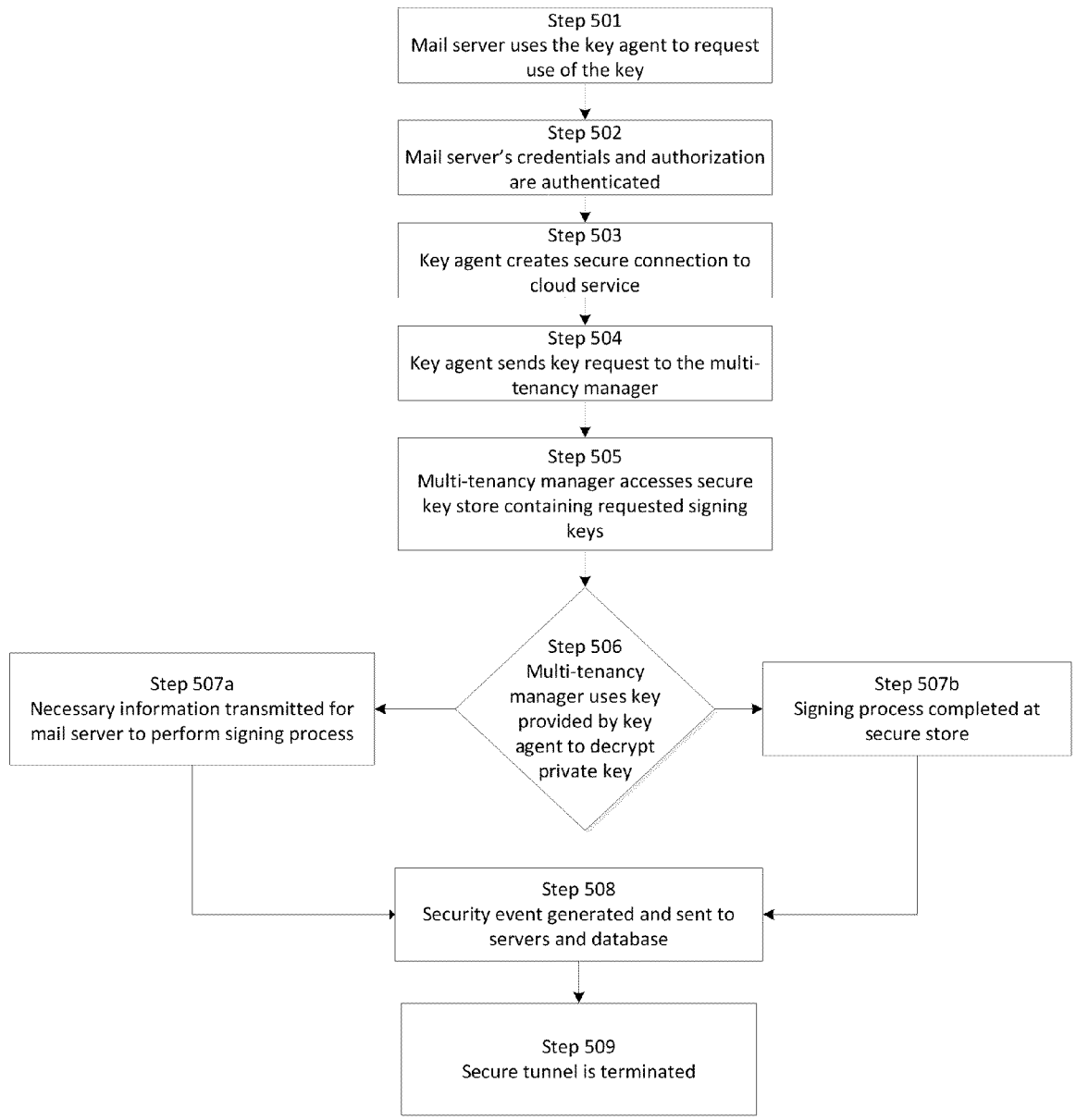
FIG. 5 depicts a flowchart for where a mail server implements use of the invention.
Figure 6:
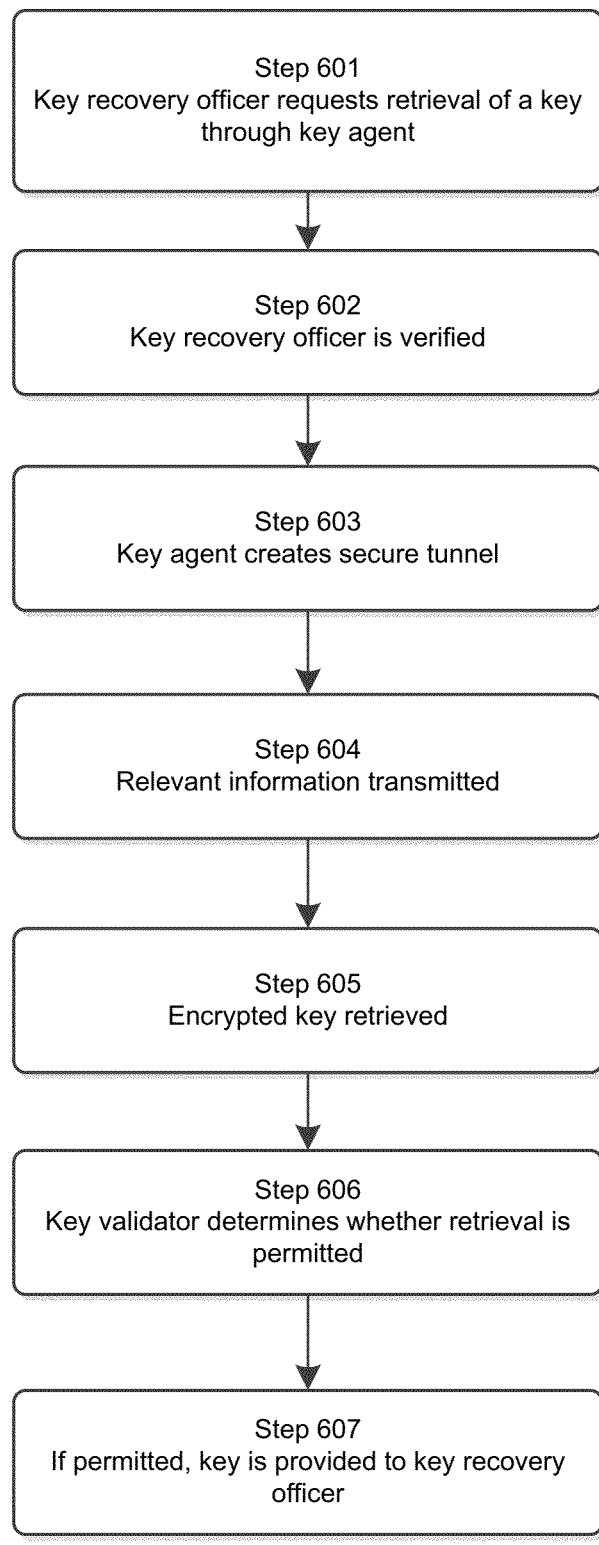
FIG. 6 shows a flow chart where the invention is used to provide key recovery services.
Figure 7:
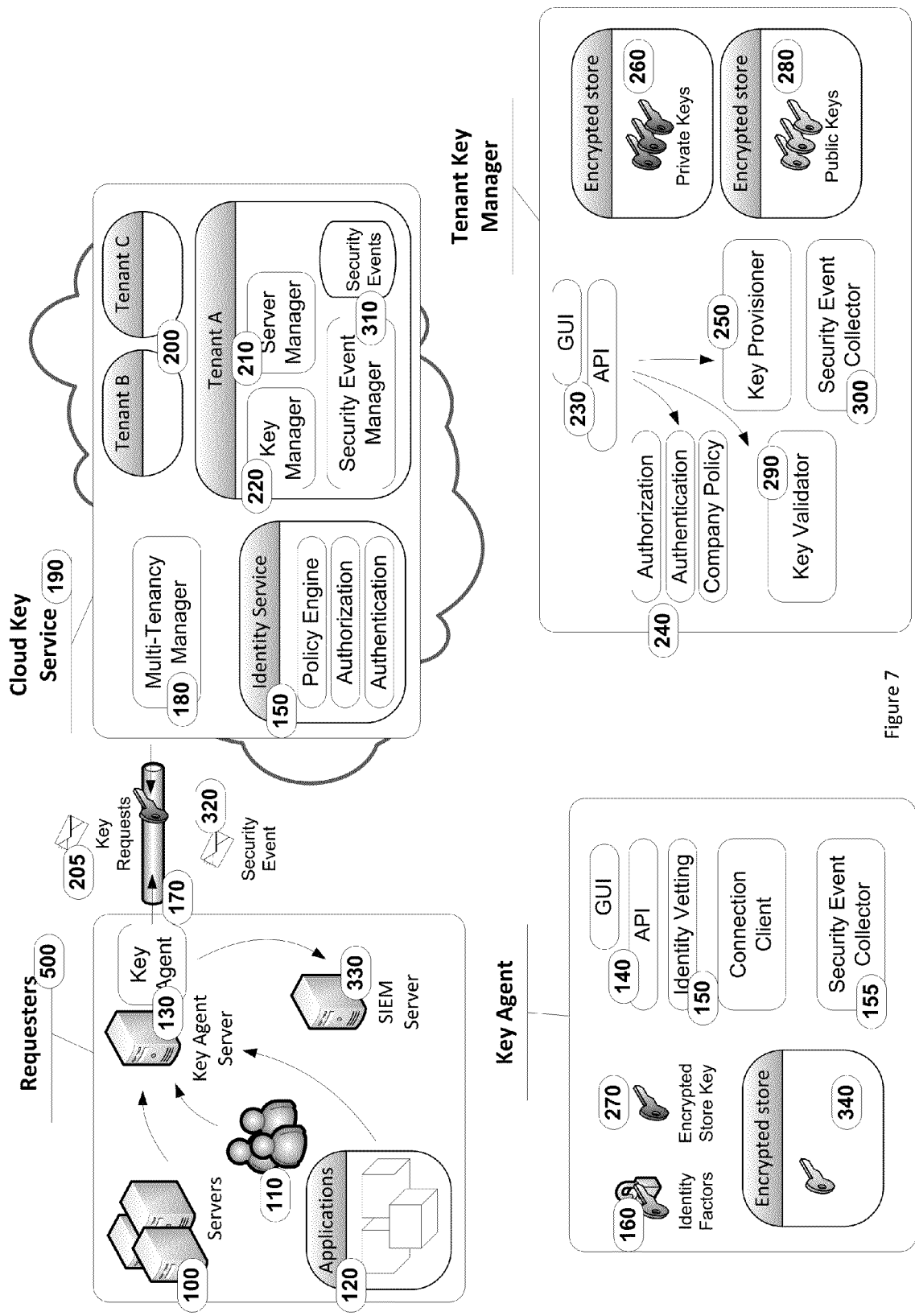
FIG. 7 depicts a diagram of possible components used in the invention and their interactions.

As shown in FIG. 5, after the key and certificate are created, the mail server can use the same process to perform key operations to decrypt/encrypt and sign mail. In Step 501, when receiving or sending mail, the mail server uses the key agent to request use of the key. In Step 502-505, the key agent authenticates the mail server's credentials and authorization, creates the secure connection, and transmits the request to the multi-tenancy manager. In Step 505, the multi-tenancy manager accesses the secure key store that contains the requested signing keys. In Step 506, the multi-tenancy manager decrypts the stored key using credentials provided by the key agent through the secure tunnel. In Step 507, the key provisioner or a similar protocol either transmits the information necessary for the mail server to perform the signing process or completes the signing process at the secure store. For security reasons based on the applicable policy, the mail server is not authorized to retrieve keys or create keys.

In Step 508, a security event about whether the process completed successfully is generated and sent to the mail server, a SIEM server, and a security events database. In Step 509, the secure tunnel is terminated. If the cloud key service did not complete the signing process, then the mail server completes the signing process and sends the email to the appropriate destination.

A key recovery officer can use the process to retrieve keys and access employee signed files and emails. In this example, the policy engine contains a rule that key recovery officers are not permitted to create, destroy, or use keys. The policy engine also specifies that key recovery officers may only retrieve keys that are revoked prior to retrieval.

In Step 601, the key recovery officer requests retrieval of a key through the key agent. In Step 602, the key recovery officer's is verified. In Step 603-604, the key agent creates the secure tunnel and transmits the relevant information to the multi-tenancy manager. In Step 605, the multi-tenancy manager accesses the key store and retrieves the encrypted key. In Step 606, the key validator ensures that the key is revoked before the multi-tenancy manger is permitted to access or transmit the encrypted key. If the key validator approves the action, the encrypted key is sent to the key recovery officer through the secure tunnel and decrypted by the key agent.

In another embodiment, a government entity needs to exchange keys frequently to ensure that a key is not hijacked to read encrypted communication. Managing frequently changing keys is very difficult for individuals and systems potentially separated by several thousand miles. To facilitate rapid key changes, the government entity utilizes a key agent to communicate with a secure key store. A multi-tenancy manager operating at the secure key store receives a communication by an entity to create and send the appropriate key for communication. The key provisioner creates the key and transmits it to the vetted requester. The key validator ensures the key has an appropriately short lifespan. When the key expires, the key agent automatically sends a new request over an encrypted tunnel. The multi-tenancy manager receives the request and has the key provisioner create a new key. This key is transmitted back to the key agent which installs the new key for use automatically. This system can be configured to automatically retrieve and install keys whenever a communication is initiated, eliminating the potential for error during the key creation, installation, and usage process.

Various tenants in the government space may include different agencies, individual teams within an agency, or private enterprises working as contractors for the government.

What is claimed is:
1. A method for encrypted email key management, comprising:
creating, by a key agent executing on a processor, a secure tunnel between the key agent and a cloud key service executing on a processor;
receiving, by the cloud key service from the key agent, a request for key generation for the email sender, the request including email sender credentials;
verifying, by the cloud key service, the request for key generation;

identifying, by the cloud key service, a tenant location on the cloud key service, the tenant location being associated with the email sender;

creating, by the cloud key service, a key pair and corresponding digital certificate for the email sender;

encrypting, by the cloud key service, the key pair and corresponding digital certificate with a key controlled by the key agent;

storing the encrypted key pair and corresponding digital certificate at the identified tenant location;

transmitting a public key from the key pair and the corresponding digital certificate to an email address specified in the digital certificate; and closing the secure tunnel.

2. A method according to claim 1, where the key agent local to email sender.

3. A method according to claim 1, wherein verifying the request for key generation comprises evaluating a cloud-based key policy.

4. A method according to claim 1, wherein verifying the request for key generation comprises verifying an identity of the email sender.

5. A method according to claim 1, further comprising:

creating, by the key agent, a second secure tunnel between the key agent and the cloud key service;

receiving, by the cloud key service from the key agent, a request for use of the key by a mail server;

identifying, by the cloud key service, the tenant location storing the encrypted key pair and corresponding digital certificate;

receiving, by the cloud key service, the key controlled by the key agent;

decrypting, by the cloud key service, the encrypted key pair and corresponding digital certificate;

performing, by the cloud key service, a key service using the decrypted key pair; and closing the second secure tunnel.

6. A method according to claim 1, where the cloud key service accesses a segmented location associated with the tenant location on the cloud-based system for decrypting, encrypting and signing key services.

7. A method according to claim 6, where the segmented location is associated with the email sender.

8. A method according to claim 1, where the key agent communicates information about the key service to the email sender.

9. A method according to claim 8, where the information comprises a digital certificate.

10. A method according to claim 8, where the information comprises a digital key.

11. A method according to claim 8, where the information comprises security events that document actions taken by the cloud key service.

12. A method according to claim 1, where the key generation is performed in accordance with a key policy located on the cloud key service.

13. A method according to claim 5, where the key service comprises deleting or revoking a key.

14. A method according to claim 13, where the key is deleted or revoked by a key provisioner.

15. A method according to claim 1, where the encrypted key pair and corresponding digital certificate is stored on a segmented location of the cloud based service.

16. A method according to claim 1, further comprising creating, by the cloud key service, at least one security event that document actions taken by the cloud key service.

17. A method according to claim 16, further comprising transmitting, by the cloud key service, at least one security event to a security events collector.

18. A method according to claim 5, where the performance of the key services are evaluated by a key validator to ensure the key service complies with the key policy, where the key policy is stored by the cloud key service.

19. A method for using keys in an email system, comprising:

receiving a request for key generation at a key agent executing on a processor from an email server, the request associated with an email sender;

creating a first secure tunnel between the key agent and a cloud key service executing on a processor;

communicating the first request to the cloud key service over the first secure tunnel;

generating a key pair at the cloud key service;

storing the generated key in an encrypted store on a segmented location on the cloud key service, where the encrypted store is encrypted using a store key controlled by the key agent;

receiving a request for a key operation at the key agent from the email server and for the email sender;

create a second secure tunnel between the key agent and the cloud key service;

communicating the request for a key operation to the cloud key service of the second secure tunnel;

assessing the segmented location on the cloud key service;

decrypting the generated key stored at the segmented location using the key controlled by the key agent; and performing the key operation by the cloud key service.

20. A method according to claim 19, further comprising validating, by the key agent, the identity of an email sender.

21. A method according to claim 19, where the key is generated on a tenant location.

22. A method according to claim 21, where the tenant location is selected by a multi-tenant manager.

23. A method according to claim 19, where the key is encrypted using a store key transmitted to the cloud key service by the key agent.

24. A system for email key management, comprising:

a key agent comprising a computer processor and computer readable memory storing instructions that cause the key agent to receive a request for key services for an email sender from a mail server and transmit the request to a cloud key service;

a cloud key service comprising:

an encrypted key store located on a segmented location of the cloud key service, the encrypted key store comprising computer readable memory configured to store keys and wherein the encrypted key store is encrypted using a store key controlled by the key agent;

a multi-tenancy manager comprising a computer processor and computer readable memory storing instructions that cause the multi-tenancy manager to route a request from the key agent and identify a tenant store in the cloud key service, wherein the tenant store is associated with the email sender; and a server manager comprising a computer processor and computer readable memory storing instructions that cause the server manager to perform a key service associated with a key stored at the tenant store.

25. A system according to claim 24, further comprising a mail server that uses the key agent to communicate with the cloud-based service.

26. A system according to claim 24, further comprising a key validator configured to ensure that the cloud key service complies with a key policy, where the key policy is located on the cloud key service.

27. A system according to claim 24, further comprising a security event collector to receive, collect or distribute security events.

28. A system according to claim 24, further comprising an identity service configured to authenticate an identity.

29. A system according to claim 24, further comprising a key provisioner.

30. An apparatus for providing cloud-based email key services, comprising:
   a processor; and
   non-transitory memory storing computer executable instructions that, when executed by the processor, cause the apparatus to at least:
      accept requests for use of a key associated with an email sender, the requests being made by an email server through a key agent;
      validate an identity of the email sender;
      identify that a key associated with the email sender does not exist at a tenant location on the cloud key service;
      in response to determining that a key associated with the email sender does not exist, generate a key for the email sender;
      identify a tenant location on the cloud key service for storing the key;
      encrypting the key using a store key, wherein the store key is controlled by the key agent; and
      verify that the key generation is performed correctly.

31. An apparatus according to claim 30, where the computer executable instructions further cause the apparatus to create security events that document actions taken by the apparatus and the security events are sent to a security events collector.

32. An apparatus according to claim 30, where the computer executable instructions further cause the apparatus to generate a digital certificate for the email sender.

33. An apparatus according to claim 30, where the computer executable instructions further cause the apparatus to open and close a secure tunnel between the key service and the key agent.

* * * * *